Sept. 10, 1963     T. E. DWYER     3,103,412
RECOVERY OF BORON COMPOUNDS FROM BORON-CONTAINING ORES
Filed Aug. 2, 1960     3 Sheets-Sheet 2

INVENTOR.
Thiel E. Dwyer
BY
Curtis, Morris, & Safford
ATTORNEYS

INVENTOR.
Thiel E. Dwyer

United States Patent Office 3,103,412
Patented Sept. 10, 1963

3,103,412
RECOVERY OF BORON COMPOUNDS FROM BORON-CONTAINING ORES
Thiel E. Dwyer, Carlstadt, N.J., assignor to Tholand, Inc., Sperryville, Va., a corporation of New York
Filed Aug. 2, 1960, Ser. No. 47,024
8 Claims. (Cl. 23—59)

This invention is concerned with the recovery of useful boron compounds from ores in which boron is present in the form of calcium borate. Among the calcium borate ores suitable for treatment in accordance with the invention are colemanite ($2CaO.3B_2O_3.5H_2O$)
ulexite ($2CaO.Na_2O.5B_2O_3.16H_2O$)
pandermite ($4CaO.5B_2O_3.7H_2O$)

and Gerstley borate which is a mixture of colemanite and ulexite. It has been found that the process of the invention is especially effective for the treatment of colemanite and hence the process will be illustratively described as applied to the recovery of boron compounds from this ore. However, it is to be understood that the present invention can also be used with advantage in processing other calmium borate-containing ores.

Most of the boron compounds in current commercial use are derived from naturally occurring borax. Large deposits of borax in such forms as tincal ($Na_2O.2B_2O_3.10H_2O$) and kernite ($Na_2O.2B_2O_3.4H_2O$) are known from which pure borax can be recovered very simply and at low cost. However, in cases where such natural borax is used as a source material the nature of the commercial end use may be such that the borax must be converted to other boron compounds by relatively expensive conversion processes. Thus, for a particular boron compound, the overall cost of production from natural borax may be greater than the cost of preparing the compound from an ore such as the calcium borate-containing ores referred to above.

For a number of commercial end uses the boron is required in the form of boric acid. The classical method of preparing boric acid involves the treatment of borax with sulfuric acid. In this process, the sulfuric acid used is a relatively expensive reagent and the sodium sulfate produced as a by-product cannot readily be converted into sulfuric acid. Thus the conversion of borax to boric acid by means of sulfuric acid is comparatively expensive. Other known methods of converting borax into boric acid are similarly costly.

One fast-growing use of boron compounds is in the fire-proofing of wood wherein ammonium borates such as the pentaborate have been found especially useful. The production of ammonium borates from natural borax is a relatively expensive and complicated process.

It is accordingly an object of the present invention to provide an improvced process for recovering boron compounds from calcium borate-containing ores such as colemanite. It is another object of the invention to provide a low-cost process for the direct conversion of the boron in calcium borate-containing ores into ammonium borates. It is still another object of the invention to provide a process for producing boron compounds from calcium borate-containing ores wherein the principal reagent used to treat the ore is regenerated and reused. It is a still further object of the invention to provide an economic process for producing ammonium pentaborate and boric acid from calcium borate-containing ores. Other objects of the invention will be in part obvious and in part pointed out hereafter.

As conducive to a clearer understanding of the present invention it may be pointed out that pure colemanite ($2CaO.3B_2O_3.5H_2O$) contains 50.8% $B_2O_3$, 27.27% CaO and 21.93% $H_2O$. On heating, colemanite decrepitates and loses its water of hydration leaving a calcined product containing about 65% $B_2O_3$ and 35% CaO. Colemanite as mined may run 30% or lower in $B_2O_3$, with the ratio of CaO to $B_2O_3$ being somewhat higher than in pure colemanite, and the remainder of the ore being gangue (usually clay) intimately mixed with fairly pure colemanite. On calcining the ore as mined the colemanite decrepitates to a very fine powder which by screening, air separation and the like can be separated from the bulk of the gangue to give a concentrate containing 50% or more $B_2O_3$ and 35 to 40% CaO.

In accordance with the traditional method of recovering boron values from colemanite, the beneficiated ore was treated with sulfuric acid. The gangue in the ore reacted to a certain extent with the acid to take up undesired iron, aluminum and other impurities into solution, at the same time using up a part of the reagent acid in the production of undesired products. As indicated above, the ore as mined contains excess CaO which is reactive with the acid, and hence a substantial excess of acid was required for treating the ore in accordance with the prior process. Since the acid used to open up the ore was not recovered, this process was quite expensive.

In accordance with the present process ammonium sulfate is used as a leaching agent to extract boron values from the ore. The use of ammonium sulfate provides a number of advantages. In the first place, the ammonium sulfate does not react with the gangue material to bring iron and aluminum salts into solution. Also, as more fully pointed out hereafter, the use of ammonium sulfate makes possible a cyclic process wherein ammonium sulfate is regenerated and reused. In cases where the process is used to produce boric acid, regeneration of the ammonium sulfate is complete, except for small process losses. In cases where the desired product is an ammonium borate, regeneration of the ammonium sulfate is only partial since ammonia is removed from the recovery system with the product and hence ammonia must be added to the system as a raw material. The excess CaO in the ore as mined initially reacts with a portion of the ammonium sulfate, but this portion of the sulfate can be regenerated as indicated hereafter and hence does not cause a reagent loss.

In order to point out more fully the nature of the present invention, reference will now be made to the accompanying drawings which comprise a series of flow sheets illustrating a preferred embodiment of the present process and several modifications thereof.

Figure 1:
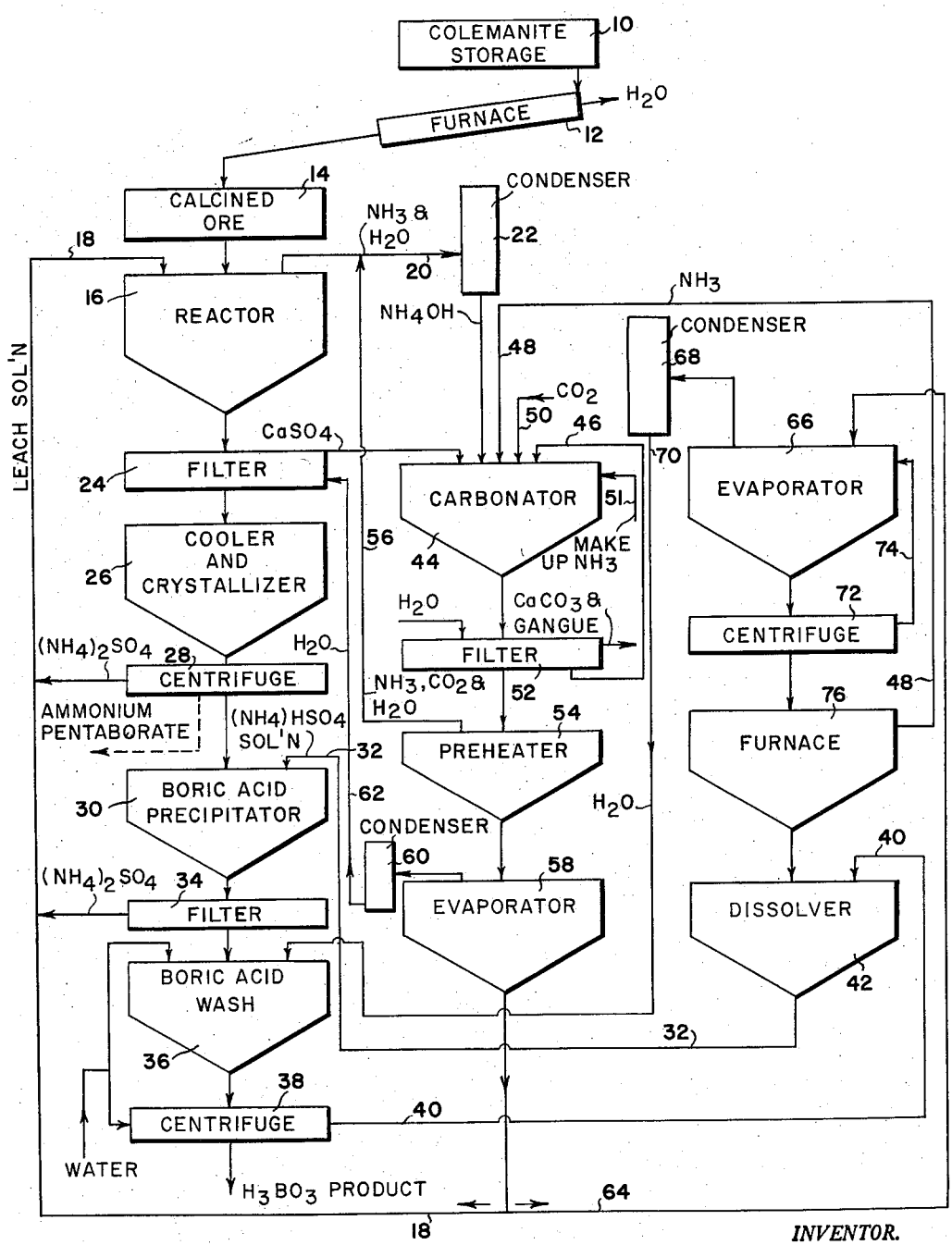
FIGURE 1 is a flow sheet of an embodiment of the present method wherein calcined colemanite is treated with ammonium sulfate to produce ammonium pentaborate and/or boric acid, with regeneration and reuse of the ammonium sulfate reagent.

Referring to FIGURE 1, colemanite ore from a storage tank 10 flows to a furnace 12 wherein it is heated to a temperature of 300° to 700° C. As indicated above, upon heating the colemanite decrepitates and loses its water of hydration to form a very fine powder. The resulting powdered ore is beneficiated by conventional techniques such as screening and air separation to produce a calcined concentrate stored in tank 14. The dehydration step may be represented by the following equation:

(1) $[2CaO.3B_2O_3.5H_2O] \rightarrow [2CaO.3B_2O_3] + 5H_2O$

From storage tank 14 the calcined concentrate is fed to a reactor 16 wherein it is mixed with aqueous ammonium sulfate solution fed through pipe 18. Reactor 16 is heated to a temperature in the range 95° to 105° C. to vaporize ammonia and water which flow through pipe 20 to a condenser 22 wherein they are condensed to form ammonium hydroxide solution. The reaction taking place within reactor 16 may be represented by the following equation:

(2) $5[2CaO.3B_2O_3] + 10(NH_4)_2SO_4 + 51H_2O$
$\rightarrow 10CaSO_4.2H_2O$
$+ 3[(NH_4)_2O.5B_2O_3.8H_2O] + 14NH_4OH$ The foregoing equation represents the overall reaction that occurs in reactor 16 and the probable reaction mechanism is somewhat as follows. The sulfate of the ammonium sulfate reacts with the calcium oxide of the ore to form calcium sulfate ($CaSO_4.2H_2O$). The ammonia of the ammonium sulfate reacts with the $B_2O_3$ portion of the ore to form a solution of ammonium tetraborate and ammonium hydroxide. At the operating temperature of the reactor, the ammonium hydroxide is vaporized as ammonia and water through pipe 20. Upon continued heating the ammonium tetraborate loses ammonia which distills off as ammonium hydroxide to leave the ammonium pentaborate in solution. At this stage the material in the reactor is an aqueous slurry with a pH of 6.5 to 7.4. The aqueous phase of the slurry is a solution of ammonium pentaborate, ammonium sulfate and a small amount of dissolved calcium sulfate and/or borate. The solid phase of the slurry comprises the gangue material of the ore and precipitated calcium sulfate.

It is possible by further heating of the slurry in reactor 16 to convert a part or all of the ammonium pentaborate to boric acid. However, this further reaction is very slow and involves the evaporation of so much water that it is not ordinarily economically attractive to produce boric acid in this way. Moreover, if the heating is stopped at the ammonium pentaborate stage, a readily filterable solid phase is obtained.

From the reactor 16 the slurry passes to a filter 24, wherein the solution is separated from the gangue material and the bulk of the calcium sulfate, and the filtrate flows to a cooler and crystalizer 26. The hot filtrate flowing to the crystallizer 26 is nearly saturated with ammonium pentaborate and also contains unreacted ammonium sulfate and dissolved calcium salts. On cooling, this solution deposits crystals of ammonium pentaborate octahydrate of high purity. Since ammonium borates produce super-saturated solutions, it is desirable to seed the cooling solution with crystals of ammonium pentaborate to obtain a good yield thereof.

The slurry of crystals and solution from the crystallizer 26 passes to a centrifuge wherein the crystals are separated from the mother liquor. The liquor, which comprises a solution of ammonium sulfate containing a certain amount of dissolved calcium salts, is mixed with the solution flowing through pipe 18, the source of which will be described hereafter. If the desired product of the process is ammonium pentaborate, the crystal separated in centrifuge 28 are washed and dried and sold as such. If on the other hand it is desired to produce boric acid, the ammonium pentaborate crystals are transferred to a precipitator 30 which is supplied with ammonium acid sulfate solution through pipe 32. The source of the ammonium acid sulfate solution will be described hereafter.

Within the precipitator 30 the ammonium pentaborate crystals are dissolved in the ammonium acid sulfate solution and react therewith to precipitate boric acid and form normal ammonium sulfate in solution. The resulting slurry flows to a filter 34 for separating the boric acid from the solution. The filtrate from filter 34 is added to the ammonium sulfate solution flowing through pipe 18.

The filter cake from filter 34, comprising relatively pure boric acid, is transferred to wash tank 36 wherein it is washed with fresh water. The slurry of boric acid and wash water passes to a centrifuge 38 in which the boric acid is separated from the wash solution. The separated boric acid is removed from the system as product at this point. The wash solution flows through pipe 40 to a dissolver 42 for purposes that will presently be described.

Reverting now to the filter 24, filter cake comprising the gangue material from the ore and precipitated calcium sulfate is transferred to a carbonator 44 wherein it is mixed with and dispersed in ammonium hydroxide from the condenser 22 and wash water entering through pipe 46. The slurry thus formed is treated with ammonia gas entering the carbonator 44 through pipe 48 from a source that will be described later and carbon dioxide entering through pipe 50. The carbon dioxide used may be obtained from any suitable source such as, for example, combustion gases.

As indicated above, in cases where ammonium pentaborate is removed from the system as product, a quantity of ammonia must be added corresponding to the amount removed in the product. The required makeup ammonia can be conveniently added to the carbonator 44 through the pipe 51.

Within the carbonator 44 the calcium sulfate is converted to calcium carbonate and the sulfate portion of the calcium sulfate is converted to ammonium sulfate in solution in accordance with the following equation:

(3) $CaSO_4.2H_2O + 2NH_4OH + CO_2$
$\rightarrow CaCO_3 + (NH_4)_2SO_4 + 3H_2O$

The resulting slurry flows to filter 52 wherein the solid phase comprising calcium carbonate and gangue material is separated and removed from the system. The filter cake is washed with fresh water which, after passing through the filter cake, flows through pipe 46 to carbonator 44.

The filtrate from filter 52 passes to a pre-heater 54 where it is heated to vaporize ammonia, carbon dioxide and water vapor which flow through pipe 56 to pipe 20 and thence to condenser 22. After preliminary heating in pre-heater 54, the solution is concentrated in evaporator 58 to the desired concentration for use in the ore leaching step of the process. Water vapor evaporated in the evaporator 58 may be condensed in a condenser 60 and returned through pipe 62 as wash water to the filter 24. The concentrated ammonium sulfate solution from evaporator 58 is divided and a portion thereof flows through pipe 18 to the reactor 16. As indicated previously, additional ammonium sulfate solution is added to the solution flowing through pipe 18 from the centrifuge 28 and the filter 34.

The portion of concentrated ammonium sulfate solution from evaporator 58 that does not flow through pipe 18 is passed through a pipe 64 to a second evaporator 66. Water evaporated from the evaporator 66 may be condensed in a condenser 68 and pumped through pipe 70 to the boric acid wash tank 36 for use as wash water therein. In the evaporator 66 the ammonium sulfate solution is concentrated to the point where ammonium sulfate crystallizes out. The crystals are separated in the centrifuge 72 and the mother liquor from the centrifuge is returned through pipe 74 to the evaporator 66.

The separated ammonium sulfate crystals are heated in a furnace 76 at a temperature of say 340° to 350° C., whereupon the ammonium sulfate is converted to ammonium acid sulfate with liberation of ammonia which passes through pipe 48 to the carbonator 44 as previously described.

The ammonium acid sulfate formed in furnace 76 is transferred to a dissolver 42 where it is dissolved in water supplied through pipe 40 from centrifuge 38. The ammonium acid sulfate solution thus formed flows through pipe 32 to the boric acid precipitator 30 for reaction with ammonium pentaborate in the manner previously described.

Still referring to FIGURE 1, in order to point out still further the nature of the present invention an illustrative quantitative example will now be given of the use of the present process to produce ammonium pentaborate. This example is based on an assumed feed to reactor 16 of 100 pounds of calcined colemanite comprising 60.6% $B_2O_3$, 33.6% CaO, and 5.8% of gangue. The calcined colemanite is treated in reactor 16 with regenerated leaching solution flowing through pipe 18 and comprising 100 pounds of ammonium sulfate, 45 pounds of ammonium pentaborate and 10 pounds of calcium borate dissolved in 670 pounds of water. During heating of the slurry within reactor 16, 14.5 pounds of ammonia and 81.0 pounds of water are vaporized and removed through pipe 20. In filter 24, 39 pounds of wash water is used to wash the filter cake. The removed filter cake comprises 103.2 pounds of $CaSO_4.2H_2O$, 5.8 pounds of gangue and 34 pounds of water.

The filtrate from filter 24 is cooled and crystallized in the crystallizer 26 to form ammonium pentaborate crystals as described above, and separation is effected in centrifuge 28. The crystals removed in centrifuge 28 comprise 94.7 pounds of ammonium pentaborate octahydrate. The mother liquor from centrifuge 28 which comprises 20.8 pounds of ammonium sulfate, 45 pounds of ammonium pentaborate and 10 pounds of calcium borate dissolved in 555 pounds of water, is added to the leach solution in pipe 18 as indicated in FIGURE 1.

The filter cake from filter 24 is treated in carbonator 44 as previously described. In the carbonator 44 the filter cake is mixed with the ammonium hydroxide from the condenser 22, 5.92 parts of make-up ammonia, 28.2 pounds of wash water through pipe 46, and 26.4 pounds of $CO_2$. As previously described, the product leaving carbonator 44 is a slurry of calcium carbonate and inert matter in an ammonium sulfate solution. The filter cake formed in filter 52 comprises 60 pounds of calcium carbonate, 5.8 pounds of inert matter and 22 pounds of water. The filter cake is washed with 50.2 pounds of water.

As previously described, the ammonium sulfate solution is heated and evaporated in two stages in pre-heater 54 and evaporator 58. The concentrated solution leaving evaporator 58 comprises 79.9 pounds of ammonium sulfate and 115 pounds of water, all of which is returned through pipe 18 to reactor 16.

If it is desired to produce boric acid rather than ammonium pentaborate, the crystals separated in centrifuge 28 are transferred to precipitator 30 as previously described. In this case, and assuming the same feed of calcined colemanite ore to the system, the concentrated ammonium sulfate solution from evaporator 58 is divided into two parts. One part comprising 33.2 pounds of ammonium sulfate and 48.4 pounds of water is returned through pipe 18. The remainder of the concentrated solution comprising 46 pounds of ammonium sulfate and 66.6 pounds of water flows through pipe 64 to the evaporator 66 wherein it is evaporated as previously described. Since the mother liquor from centrifuge 72 is returned to evaporator 66 the quantity of ammonium sulfate crystals fed to furnace 76 is the same as that in the entering solution, namely, 46 pounds. Within furnace 76, the ammonium sulfate is heated to produce 5.92 pounds of ammonia which is returned to carbonator 44 through pipe 48, and 40.4 pounds of molten ammonium acid sulfate which flows to the dissolver 42. As previously described, within dissolver 42 the acid sulfate is dissolved in the wash solution entering through pipe 40 and the resulting solution flows through pipe 32 to the boric acid precipitator 30, wherein it reacts with ammonium pentaborate to produce boric acid as a precipitate. The boric acid, after filtration, washing and centrifuging, comprises 107.6 of $H_3BO_3$ containing five pounds of water. The filtrate from filter 34 comprises 46 pounds of ammonium sulfate and 66.6 pounds of water.

From the foregoing description, it will be apparent that the present process may be used to produce boric acid from colemanite ore, with substantially complete regeneration and re-use of the leaching agent used for extracting the boron values from the ore, except for relatively small process losses. From an over-all standpoint, concentrated colemanite ore and carbon dioxide are fed to the process and boric acid product and by-product calcium carbonate and gangue are produced. Thus, the raw material cost of the process is exceptionally low.

It is evident that the process can be used to produce ammonium pentaborate or boric acid, or both products in any desired ratio. To the extent that ammonium pentaborate is removed from the system as product, make-up ammonia must be added to compensate for ammonia removed in the ammonium pentaborate product.

Figure 2:
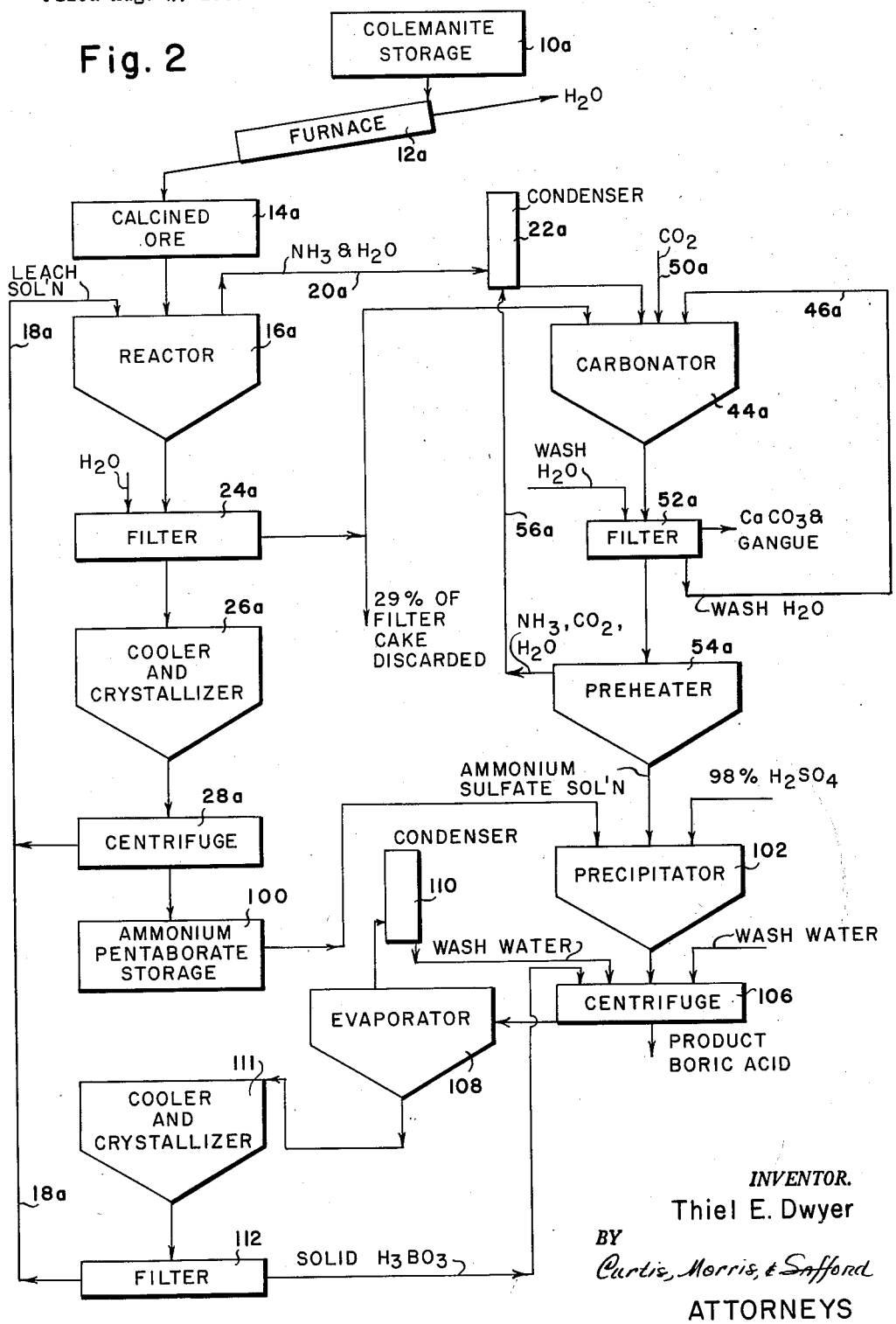
FIGURE 2 is a modification of the procedure of FIGURE 1 wherein the ammonium pentaborate is converted to boric acid with sulfuric acid rather than with ammonium acid sulfate.

Turning now to FIGURE 2 of the drawings, the process illustrated therein is similar to that of FIGURE 1, but differs therefrom in the method of converting ammonium pentaborate to boric acid. In order to bring out the relationship between FIGURE 1 and FIGURE 2, corresponding apparatus elements in the two figures are given the same reference characters, with those in FIGURE 2 being separately identified by the letter "a." The calcined ore is reacted in reactor 16a, with aqueous ammonium sulfate leaching solution which enters through pipe 18a. Ammonia and water vaporized in reactor 16a flow through pipe 20a to condenser 22a. The slurry from reactor 16a is filtered in filter 24a, and the mother liquor from the filter is cooled, crystallized and centrifuged to separate ammonium pentaborate which passes to a storage tank 100.

In the system of FIGURE 2, conversion of the ammonium pentaborate to boric acid is effected with the use of sulfuric acid. It is evident that when sulfuric acid is used for this conversion step sulfate is added to the system and therefore, in order to preserve the material balance, sulfate must also be removed at some point in the system. In the process of FIGURE 2, removal of excess sulfate is effected by rejecting a part of the filter cake from filter 24a. More particularly, as indicated in FIGURE 2, 29% of this filter cake is discarded, and the remainder is transferred to carbonator 44a. The reaction in carbonator 44a is similar to that in carbonator 44. Ammonium hydroxide from condenser 22a flows into the carbonator, as well as carbon dioxide from pipe 50a. Also wash water from filter 52a is added through pipe 46a. The filter cake from filter 52a comprising calcium carbonate and gangue is rejected, as in FIGURE 1, and the mother liquor flows on to pre-heater 54a, wherein ammonia, water and $CO_2$ are driven off and flow through 56a to condenser 22a.

The partially concentrated ammonium sulfate solution from pre-heater 54a flows to a precipitator 102. Ammonium pentaborate from storage tank 100 is added to the precipitator and dissolved in the ammonium sulfate solution. Also, sulfuric acid is added through pipe 104 in an amount sufficient to convert the boron of the pentaborate into boric acid. A certain amount of the boric acid formed precipitates in the precipitator 102 to form a slurry which then flows to centrifuge 106. The solid boric acid separated in centrifuge 106 is removed from the system as product.

The liquor separated in centrifuge 106 goes to an evaporator 108 wherein it is concentrated. Vapors evolved in evaporator 108 are condensed in a condenser 110, and the condensate is used as wash water for centrifuge 106. Concentrated liquor from evaporator 108 flows to a cooler and crystallizer 111, wherein it is cooled to cause further quantities of boric acid to be precipitated. The precipitated boric acid is separated in a filter 112 and returned to the centrifuge 106 for further dehydration. Filtrate from filter 112 containing largely ammonium sulfate is returned through pipe 18a to the reactor 16a. The return leaching solution contains a certain amount of dissolved boric acid which remains in solution and goes through the cycle to end up as ammonium pentaborate again. Because of this recycling of a small part of the boric acid, it is necessary to add to precipitator 102 somewhat more than the theoretical amount of sulfuric acid required. The excess acid added through pipe 104 may be of the order of five percent by weight of the theoretical amount required.

Figure 3:
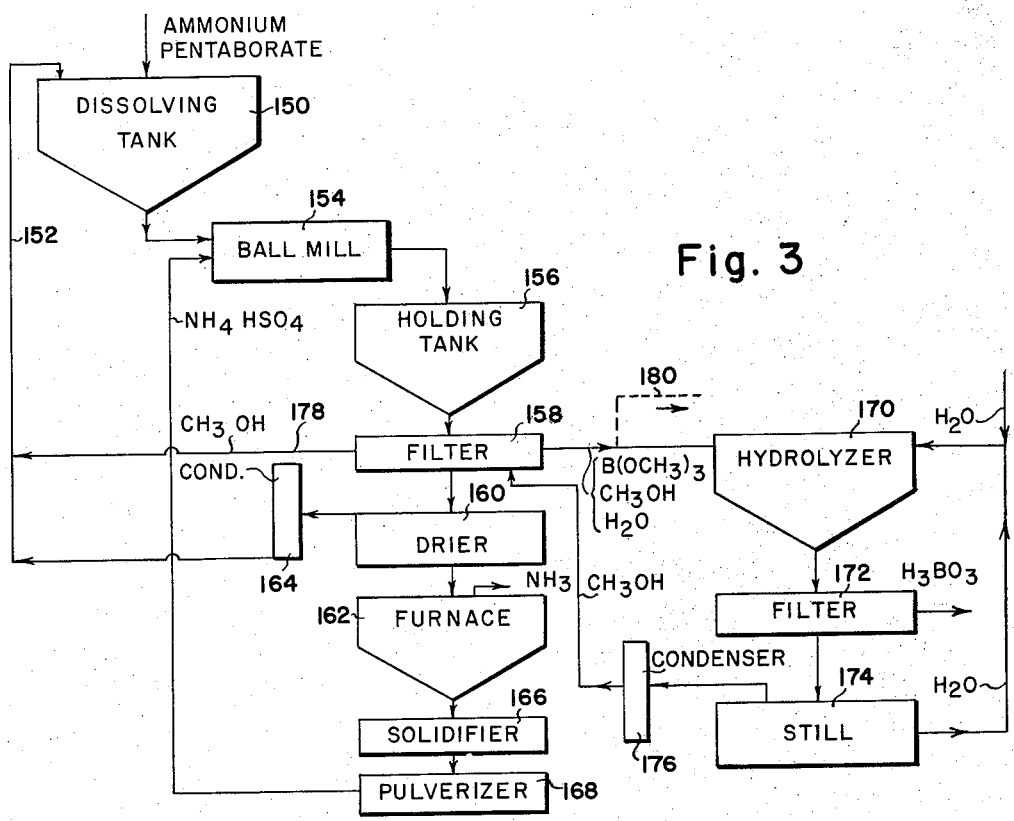
FIGURE 3 illustrates a modified procedure for converting ammonium pentaborate into boric acid wherein trimethyl borate is formed as an intermediate product; and, FIGURE 4 is similar to FIGURE 3, but illustrates a modification wherein sulfuric acid rather than ammonium acid sulfate is used as a source of acid.
Figure 4:
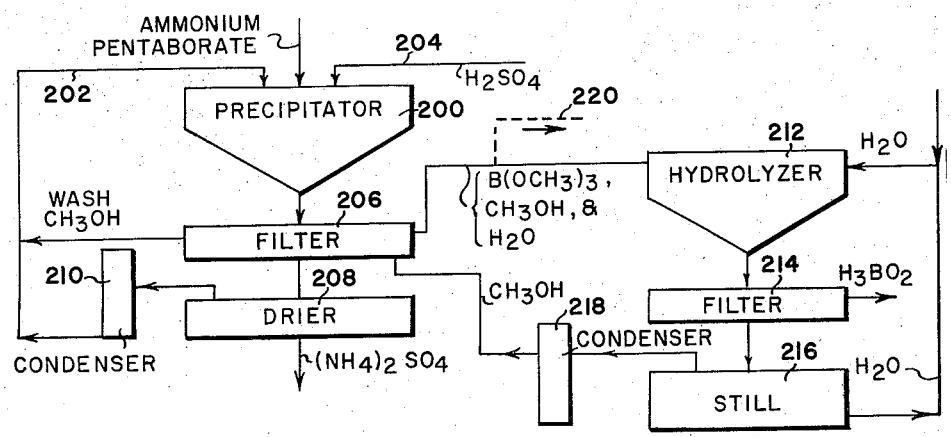

Turning now to FIGURES 3 and 4 of the drawings, these figures illustrate modified methods of converting ammonium pentaborate into boric acid. Referring particularly to FIGURE 3, this figure illustrates a system wherein methyl alcohol is used as a reaction medium for the conversion of the pentaborate to boric acid. In general, the process illustrated in FIGURE 3 comprises dissolving ammonium pentaborate in methanol, milling the resulting solution with ammonium acid sulfate to produce a solution of trimethyl borate in methanol and solid ammonium sulfate, separating the ammonium sulfate from the methyl borate solution, reprocessing the separated ammonium sulfate, and hydrolyzing the trimethyl borate to recover the boric acid therefrom.

The system shown in FIGURE 3 includes a dissolving tank 150 that is charged with methyl alcohol through a pipe 152. Ammonium pentaborate is added to the methanol in dissolving tank 150, and dissolves therein. The resulting solution is mixed with ammonium acid sulfate in a ball mill 154. After thorough milling and mixing of the mixture in mill 154, it is transferred to a holding tank 156, wherein it is permitted to stand for a period of several hours to insure complete conversion of the boron content of the pentaborate to trimethylborate.

From holding tank 156, the mixture passes to a filter 158 for separation of the trimethylborate-methanol solution from solid ammonium sulfate. The filter cake passes successively to a dryer 160 and a furnace 162. Methanol that is vaporized in dryer 160 is condensed in a condenser 164, and the condensate passes into pipe 152 which supplies dissolving tank 150 with methanol.

In furnace 162, the ammonium sulfate is heated to convert it into ammonium acid sulfate. Ammonia evolved during this heating step can be used in the carbonator 44 of FIGURE 1. Molten ammonium acid sulfate from furnace 162 is cooled and solidified in a solidifier 166, and pulverized in a pulverizer 168, whereupon it is returned to the ball mill 154 for reaction with further quantities of pentaborate-methanol solution from tank 150.

Filtrate from the filter 158 goes to a hydrolyzer tank 170 to which water is added to hydrolyze the trimethyl borate and precipitate boric acid therefrom. The resulting slurry passes to a filter 172, wherein solid boric acid is separated and removed as product. The filtrate from filter 172 passes to a still 174 which operates to separate the methanol and water. Methanol vapors from still 174 are condensed in a condenser 176. The resulting condensate is used as a wash liquid in filter 158 and then passes through pipe 178 to the methanol supply pipe 152. Water from the still 174 is returned to hydrolyzer 170. The modified process of FIGURE 3 is characterized by the fact that it produces exceptionally pure boric acid.

FIGURE 4 illustrates a method of converting ammonium pentaborate into boric acid which is in some respects similar to the system of FIGURE 2, and in other respects similar to the system of FIGURE 3. Referring to FIGURE 4, the precipitator 200 is charged with methanol through a supply pipe 202. Ammonium pentaborate is added to the precipitator 200 and dissolved in the methanol therein. Sulfuric acid is added to the precipitator through pipe 204, and mixed with the methanol solution therein to produce a solution of trimethyl borate in methanol and solid ammonium sulfate.

The slurry formed in precipitator 200 is transferred to filter 206 for filtration. The filter cake, composed essentially of ammonium sulfate, passes to a dryer 208 wherein it is dried. Methanol vaporized in the dryer 208 is condensed in a condenser 210 and the condensate returned to the methanol supply pipe 202. Dried ammonium sulfate from the dryer 208 is removed from the system and disposed of as desired. It may be used, for example, as a component of the leach solution fed to the reactor 16 of FIGURE 1.

Filtrate from filter 206 comprising a solution of trimethyl borate in methanol is transferred to a hydrolyzer 212 wherein it is mixed with added water and hydrolyzed to precipitate boric acid. The precipitated boric acid is removed in a filter 214, and the filtrate is distilled in still 216 to recover methanol therefrom. The methanol vapors from still 216 are condensed in condenser 218, and the condensate is used as a wash liquid in filter 206 and then recycled to the methanol supply pipe 202 for supplying precipitator 200.

In the production of certain compounds of boron such as the boranes, it is desirable to use a methanol solution of methyl borate as a starting material, and the present process may be used to produce this starting material. Referring to FIGURE 3, the filtrate from filter 158 is a mixture of methanol, methyl borate and water which can be distilled to produce a methanol-methyl borate azeotrope. If desired, some or all of this filtrate can be withdrawn through pipe 180 and distilled to yield the methanol-methyl borate azeotrope. It is evident that to the extent that methanol is withdrawn through pipe 180, make-up methanol should be added to maintain a methanol balance in the system.

Referring to FIGURE 4, in like manner the filtrate from filter 206 of FIGURE 4 may be withdrawn through pipe 220 and distilled to yield the methanol-methyl borate azeotrope.

From the foregoing description, it should be apparent that the present invention provides an exceptionally economic method of producing ammonium pentaborate and/or boric acid from colemanite. As pointed out at the beginning of the present specification, the process is also applicable to the recovery of boron values from other calcium borate ores, such as ulexite and pandermite. The use of ammonium sulfate as the leaching agent for extracting the boron values from the ore provides the advantage that the leaching agent can be rather simply and readily regenerated and re-used in the process. In so far as the system of FIGURE 1 is concerned, the only raw material required, other than the ore, to produce boric acid from the colemanite ore, is carbon dioxide which may be derived from such common and inexpensive sources as flue gases. Hence, the material cost of this process is very low.

It is, of course, to be understood that the specific examples given herein are illustrative only, and that numerous changes can be made in the operating details given without departing from the spirit of the invention as defined in the appended claims.

I claim:

1. The method of treating calcium borate ores to recover useful boron compounds therefrom, which comprises mixing said ore with aqueous ammonium sulfate; heating the mixture to a temperature of 95° to 105° C. to produce a slurry of ammonium pentaborate solution, precipitated calcium sulfate and gangue; filtering the slurry to remove said calcium sulfate and gangue; cooling the filtrate to cause ammonium pentaborate to crystallize therefrom; and separating the crystallized pentaborate from said filtrate.

2. The method of treating calcium borate ores to recover useful boron compounds therefrom which comprises mixing said ore with aqueous ammonium sulfate, heating the mixture at a temperature sufficient to produce ammonium borate solution and precipitate calcium sulfate, separating said precipitated calcium sulfate from said ammonium borate solution, recovering ammonium borate from said solution by crystallization, treating said calcium sulfate with aqueous ammonia and carbon dioxide to form an ammonium sulfate solution and calcium carbonate, and using the thus-formed ammonium sulfate solution to treat further quantities of said ore.

3. The method of treating calcium borate ores, which comprises heating said ore with aqueous ammonium sulfate at a temperature sufficient to produce an ammonium borate solution and precipitated calcium sulfate, separating the precipitated calcium sulfate from said solution, recovering ammonium borate from said solution by crystallization, reacting the recovered ammonium borate with ammonium acid sulfate to form boric acid and normal ammonium sulfate, recovering said boric acid from the reaction product and using the thus-formed ammonium sulfate to treat additional quantities of ore.

4. The method of treating calcium borate ores to recover useful boron compounds therefrom, which comprises reacting said ore with aqueous ammonium sulfate at a temperature of 95° to 105° C. to produce an ammonium borate solution and precipitated calcium sulfate, filtering the precipitated calcium sulfate from said solution, recovering ammonium borate from said solution by crystallization, treating the recovered ammonium borate with sulfuric acid to form boric acid therefrom, and recovering said boric acid from the resulting reaction products.

5. The method of treating calcium borate ore to recover boron compounds therefrom, which comprises heating said ore with aqueous ammonium sulfate at a temperature sufficient to produce an ammonium borate solution and precipitated calcium sulfate, separating the precipitated calcium sulfate from said solution, recovering ammonium borate from said solution, dissolving the recovered ammonium borate in methyl alcohol, treating the resulting methyl alcohol solution with an acid medium selected from the group consisting of ammonium acid sulfate and sulfuric acid to form a solution of trimethyl borate in methyl alcohol and distilling said trimethyl borate solution to separate a methanol-methyl borate azeotrope therefrom.

6. The method of treating calcium borate ore to recover boron compounds therefrom which comprises heating said ore with aqueous ammonium sulfate at a temperature sufficient to produce an ammonium borate solution and precipitated calcium sulfate, separating the precipitated calcium sulfate from said solution, recovering ammonium borate from said solution, dissolving the recovered ammonium borate in methyl alcohol, treating the resulting methyl alcohol solution with an acid medium selected from the group consisting of ammonium acid sulfate and sulfuric acid to form a solution of trimethyl borate in methyl alcohol, and hydrolyzing said trimethyl borate solution to recover boric acid therefrom.

7. A method according to claim 6 and wherein said acid medium is ammonium acid sulfate.

8. A method according to claim 6 and wherein said acid medium is sulfuric acid.

References Cited in the file of this patent
UNITED STATES PATENTS

| | | |
|---|---|---|
| 1,892,341 | Hackspill et al. | Dec. 27, 1932 |
| 2,102,126 | Peterson | Dec. 14, 1937 |
| 2,867,502 | Strange et al. | Jan. 6, 1959 |
| 3,018,163 | May et al. | Jan. 23, 1962 |